United States Patent Office 3,490,987
Patented Jan. 20, 1970

3,490,987
ADHESIVES FROM LINEAR HYDROXY-TERMINATED POLYURETHANES CROSS - LINKED WITH TRIISOCYANATES
Hans Bauriedel, Monheim, Rhineland, Germany, assignor to Henkel & Cie., GmbH, Dusseldorf, Germany, a corporation of Germany
No Drawing. Filed Dec. 19, 1967, Ser. No. 691,696
Claims priority, application Germany, Jan. 27, 1967, H 61,685
Int. Cl. B32b 27/40; B44d 1/44
U.S. Cl. 161—190     4 Claims

ABSTRACT OF THE DISCLOSURE

Novel adhesives produced by reacting a linear polyester and/or polyether having two free hydroxyl groups with less than molar amounts of an organic lower molecular weight diisocyanate followed by reaction with an excess of a low molecular weight triisocyanate and their use.

PRIOR ART

Various adhesives comprised of the reaction product of a polyvalent organic polyisocyanate with a compound containing hydroxy groups are known but these two-component adhesives have the disadvantage of a relatively short pot life.

OBJECTS OF THE INVENTION

It is an object of the invention to provide novel adhesives having a prolonged pot life.
It is another object of the invention to provide novel ahesives having superior tensile strength and heat stability.
These and other objects and advantages of the invention will become obvious from the following detailed description.

THE INVENTION

The novel adhesives of the invention are produced by the reaction of at least one linear compound selected from the group consisting of polyesters and polyethers having a molecular weight of about 500 to about 10,000 and having two hydroxy groups with less than molar amounts of a low molecular weight diisocyanate and reacting the resulting product with an excess of a low molecular weight triisocyanate to form a product having free isocyanate groups.

A preferred embodiment of the invention is an adhesive formed by the reaction of at least one linear compound selected from the group consisting of polyesters and polyethers having a molecular weight of 800 to 10,000 and having 2 free hydroxy groups with an organic lower molecular weight diisocyanate having 6 to 40 carbon atoms in a molar ratio of hydroxy group to isocyanate group of 1.2 to 2.2 and reacting the resulting product with an organic low-molecular weight triisosyanate having 10 to 40 carbon atoms in a molar ratio of hydroxy group to isocyanate group of 0.35 to 0.20 to form an adhesive having free isocyanate groups.

Suitable linear polyesters having a molecular weight of 500 to 10,000, preferably 800 to 5,000 are prepared by esterification of dicarboxylic acids or transesterification of methyl esters of dicarboxylic acids with a dihydroxyl compound. Examples of suitable dicarboxylic acids are aliphatic acids such as adipic acid, glutaric acid, trimethyl adipic acid, pimelic acid, etc.; aromatic acids such as phthalic acid, terephathalic acid, naphthalene dicarboxylic acid, etc.; cycloalkyl acids such as cyclohexane dicarboxylic acid; unsaturated acids such as maleic acid, fumaric acid, hexene dicarboxylic acid, etc.; acids containing hetero atoms such as O, S or N such as diglycolic acid, ethylether-2,2'-dicarboxylic acid, thiodiglycolic acid, etc.

The dihydroxy compounds have 2 to 8 carbon atoms and may be aliphatic such as ethylene glycol, propylene glycol, butylene-1,3-diol, butylene-1,4-diol, butylene-2,3-diol, 2,2 - dimethylpropane - 1,3 - diol (neopentylglycol), 2,2-diethylpropane-1,3-diol, 2 - methyl-2-propylpropane-1,3-diol, isomeric octanediols, etc.; unsaturated dihydroxy compounds such as heptenediol, butynediol, etc.; and dihydroxy compounds containing N, O or S heteroatoms such as diethylene glycol, triethylene glycol, thioethylene glycol, diethanolamine, N-methyl diethanolamine, etc.

The polyethers having a molecular weight of 500 to 10,000 can be made in a known manner by splitting of water from a dihydroxy compound of 2 to 8 particularly 2 to 4 carbon atoms or by ring opening polymerization of an alkylene oxide. The dihydroxy compounds may be the same as the compounds discussed above for the formation of polyesters. Examples of suitable alkylene oxides are ethylene oxide, propylene oxide, tetrahydrofuran, etc.

The low molecular weight diisocyanates may be aliphatic or aromatic and may have 6 to 40 carbon atoms. Examples of suitable diisocyanates are hexane-1,6-diisocyanate, decane-1,10-diisocyanate, diisocyanates derived from dimerized fatty acids, phenylene-1,4-diisocyanate, toluylene-2,4-diisocyanate, toluylene - 2,6 - diisocyanate, naphthylene-1,5-diisocyanate, diphenylmethane-4,4'-diisocyanate, diphenyl-methane-3,3'-dimethoxy - 4,4' - diisocyanate, etc.

Examples of suitable low molecular weight triisocyanates are aliphatic or aromatic compounds of 10 to 40 carbon atoms such as the trimerization product of hexane-1,6-diisocyanate of the formula

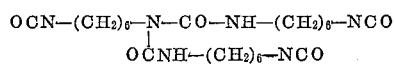

toluyl-2,4-6-triisocyanate, naphthalene-1,3,7-triisocyanate, diphenylmethane-2,4,4'-triisocyanate, triphenylmethane triisocyanate, adduct of isomeric toluylene diisocyanates with trimethylolpropane in a 3:1 ratio, etc.

Both condensation reactions with the polyisocyanates are preferably effected in an inert organic solvent. Examples of suitable solvents are aromatic hydrocarbons such as toluene, xylene, tetrahydronaphthalene, decahydronaphthalene, etc.; chlorinated hydrocarbons such as methylene chloride, chloroform, dichloroethane, trichloroethane; ethers such as diisopropyl ether, tetrahydrofuran, dioxane, ethylene glycol dimethyl ether, etc.; esters such as ethyl acetate, butyl acetate, etc.; ketones such as acetone, methyl ethyl ketone, methyl isobutyl ketone, cyclohexanone, etc.

The time for the reaction between the polyesters and/or polyethers containing OH groups and the polyvalent isocyanates depends upon the reactivity of the particular isocyanates, but it is generally between about ¼ and 6 hours. The reaction temperature may be between about 40° and 160° C.

The solutions of the reaction products which still contain free isocyanate groups may be used directly as adhesives, preferably after evaporation of excess solvents. When used, the solution should have a solids content of about 20 to 60%. The solutions of the reaction products containing isocyanate groups are outstanding because they have a relatively low viscosity which can be determined by the outflow time from an outflow cup, for example according to DIN 53,211. For an outflow cup of a diameter of 4 mm., the outflow time should be between about 10 and 120 seconds.

Still other auxiliary ingredients may be added to the adhesive solutions, such as inert high-molecular weight substances such as polyvinyl acetate or copolymers thereof or copolymers of vinyl chloride with other monomers, such as vinyl acetal. If desired, accelerators may also be added to the solutions. Such compounds are tertiary amines, such as diazabicyclo-(2,2,2)-octane, or organic metallic compounds, such as dibutyl tin dilaurate.

With the adhesives of the invention, a variety of materials can be glued to one another, such as paper, cellulose hydrate or plastics, such as polyethylene, polypropylene, polyterephthalate, polyvinyl chloride, copolymers of vinylchloride with vinylidene chloride, copolymers of vinyl acetate with low olefins, polyamides, rubber hydrochloride or metal foils made of aluminum, tin, lead, copper, etc.

Preferably the adhesives according to the invention are used for the production of compound foils, particularly compound foils of polyethylene, polypropylene, linear polyester, aluminum, paper and cellulose hydrate.

In the production of adhesive bonds, provision must be made for sufficient quantities of water to obtain crosslinking of the adhesive film and this may be before or after the joining of the materials. For permeable materials, such as paper, storage of the adhesive film in normal atmosphere saturated with water vapor is sufficient. For the production of compound foils, for example, it may be advantageous, particularly with foils not permeable to water vapor, to humidify the air fed to the drying duct of the laminating machine. Further, it is possible in the production of the adhesive bonds in the lamination of foils to provide one part or one of the two foils with adhesive and to moisten the other part or the second foil with water, steam or air containing water vapor, in suitable manner. Due to the relatively low content of free isocyanate groups in the products of the invention, however, only small amounts of water are necessary for the crosslinking of the adhesive film.

The bonds or laminations produced with the products of the invention containing free isocyanate groups have an extraordinary tensile strength, so that if separated, usually the material breaks. They are further very stable to the action of heat, so that compound foils produced by these bonds can be welded without difficulties.

In the following examples there are described several preferred embodiments to illustrate the invention. However, it should be understood that the invention is not intended to be limited to the specific embodiments.

Example I 25 kg. of a commercial linear polyester (esterification product of adipic acid and diethylene glycol having an OH number of 39.6) were mixed in an agitator vessel equipped with a reflux condenser with a solution of 1.1 kg. of diphenylmethane-4,4′-diisocyanate in 14.9 kg. of toluene and the mixture was heated with agitation at 70° C. for 2 hours. Then, 9 kg. of a 75% solution of an adduct of toluylene diisocyanate and trimethylol propane (molar ratio 3:1) in ethyl acetate were added thereto and the mixture was stirred for another 3 hours at 70° C. After cooling, the product was diluted with anhydrous ethyl acetate to a solids content of 30%. The outflow time of this adhesive solution from a standardized outflow cup (DIN 53,211, nozzle 4) was 17 seconds.

In a Revaplast laminating machine there was produced by means of dry lamination with the adhesive produced as described above, a composite of counter-printed, unlacquered cellulose hydrate foil (30 g./m.$^2$) and bleached soda kraft paper (40 g./m.$^2$). The weight of the adhesive application was, after evaporation of the solvent, 2 g./m.$^2$. The drying temperatures were about 55° C. The drawoff of the foils was 60 m./minute. After about 12 hours, the lamination was so strong that the paper tore when an attempt was made to separate the composite.

Example II 25 kg. of a commercial linear polyester (esterification product of adipic acid, hexane-1,6-diol, neopentyl glycol and ethylene glycol having an OH number of 58.9) were heated with 1.64 kg. of diphenylmethane-4,4′-diisocyanate in 8.65 kg. of toluene with agitation for 3 hours at 70° C. Then, 14.7 kg. of the adduct of toluylene diisocyanate and trimethylol propane (molar ratio 3:1) was added as a 75% solution in ethyl acetate and agitation was continued for another three hours at 70° C. After cooling, the product was diluted with anhydrous ethyl acetate to a solids content of 30%. The outflow time of this adhesive solution from a standardized outflow cup (DIN 53,211, nozzle 4) was 18 seconds.

On a laminating machine (Model "Reco" of Kroenert), a composite from polyester foil ($12\mu$) and polyethylene ($50\mu$), 60 cm. wide, was produced by the method of dry lamination using the adhesive produced as described above. The weight of the adhesive after evaporation of the solvent was 1.5 g./m.$^2$. The drying temperature in the duct was 60° C. and the running speed of the foils was 70 m./minute. The crosslinking of the adhesive was initiated by adding humidified air in the last section of the duct. After two days of storage in the roll, a peeling strength of about 250 p./cm. was measured on samples cut transversely to the web direction, (peeling angle 180°, draw-off speed 100 mm./minute). The bond welding of the foils remained stable at 150° C.

Example III 25 kg. of a commercial linear polyester, (esterification product of adipic acid, hexane-1,6-diol, neopentyl glycol and propanediol-1,3 having an OH number of 60.9) were mixed with 18 kg. of toluene and 1.7 kg. of diphenylmethane-4,4′-diisocyanate and the mixture was heated for 3 hours at 60° C. Then, 15.2 kg. of a 75% solution of an adduct of toluylene-diisocyanate and trimethylol propane (molar ratio 3:1) were added followed by heating for another 2 hours at 80° C. After cooling, the reaction product was diluted to a solids content of 30% with anhydrous ethyl acetate. The adhesive solution thus produced had an outflow time from a standardized outflow cup (DIN 53,211, nozzle 4) of 20 seconds.

In a laminating machine ("Lamicoater"), a composite of aluminum ($9\mu$) with polypropylene foil ($20\mu$) was produced by the method of dry lamination, using the adhesive produced as described above. The weight of the dry application was 2 g./m.$^2$ and the running speed 80 m./minute. The drying temperature was about 60° C. In the last section of the drying duct the applied air was humidified. After storage for two days in the roll, the composite showed a peeling strength of about 200 p./cm. (transversely cut samples, peeling angle 180 deg., draw-off speed 100 mm./minute).

Various modifications of the invention may be made without departing from the spirit or scope thereof and it is to be understood that the invention is to be limited only as defined in the appended claims.

I claim:
1. An adhesive produced by the reaction of at least one linear compound selected from the group consisting of polyesters and polyethers having a molecular weight of 500 to 10,000 and having 2 free hydroxy groups with an organic low molecular weight diisocyanate having 6 to 40 carbon atoms in a molar ratio of hydroxy group to isocyanate group of 1.2 to 2.2 and reacting the resulting product with an organic low-molecular weight triisocyanate having 10 to 40 carbon atoms in a molar ratio of hydroxy group to isocyanate group of 0.35 to 0.20 to form an adhesive having free isocyanate groups.

2. The adhesive of claim 1 wherein the linear compound has a molecular weight of 800 to 5,000.

3. A composite foil wherein the foils are bonded with an adhesive of claim 1.

4. The composite foil of claim 3 wherein the foils are made of a component selected from the group consisting of polyethylene, polypropylene, linear polyesters, aluminum, paper and cellulose hydrate.

References Cited

UNITED STATES PATENTS

| | | | |
|---|---|---|---|
| 2,967,117 | 1/1961 | Arledter et al. | |
| 2,929,800 | 3/1960 | Hill | 260—77.5 |
| 3,201,372 | 8/1965 | Wagner | 260—77.5 |
| 3,284,479 | 11/1966 | Windemuth et al. | 260—453 |
| 3,290,208 | 12/1966 | Lewis et al. | 161—190 |

OTHER REFERENCES

Vieweg et al.: Kunstctoff-Handbuch, Band VII, Polyurethane, Carl Hanser Verdag, Muenchen (1966) pp. 717–733.

DONALD E. CZAJA, Primary Examiner

H. S. COCKERAM, Assistant Examiner

U.S. Cl. X.R.

117—127, 138.8, 132, 143, 155; 156—331; 161—219, 250; 260—75, 77.5